(12) United States Patent
Lopez

(10) Patent No.: US 10,351,153 B2
(45) Date of Patent: Jul. 16, 2019

(54) SUPPORTIVE CUSHION AND SHOPPING CART RESTRAINT FOR CHILD OR INFANT

(71) Applicant: Valerie Faith Lopez, Escondido, CA (US)

(72) Inventor: Valerie Faith Lopez, Escondido, CA (US)

( * ) Notice: Subject to any disclaimer, the term of this patent is extended or adjusted under 35 U.S.C. 154(b) by 0 days.

(21) Appl. No.: 15/924,022

(22) Filed: Mar. 16, 2018

(65) Prior Publication Data

US 2018/0312186 A1 Nov. 1, 2018

Related U.S. Application Data

(60) Provisional application No. 62/492,012, filed on Apr. 28, 2017.

(51) Int. Cl.
*B62B 3/14* (2006.01)
*A47D 1/00* (2006.01)
*A47D 15/00* (2006.01)

(52) U.S. Cl.
CPC ............ *B62B 3/1444* (2013.01); *A47D 1/006* (2013.01); *A47D 15/006* (2013.01); *B62B 3/1448* (2013.01); *B62B 3/1452* (2013.01)

(58) Field of Classification Search
CPC ..... A47D 1/006; A47D 15/006; B62B 3/1444
USPC .................................................... 297/256.17
See application file for complete search history.

(56) References Cited

U.S. PATENT DOCUMENTS

| 4,666,207 | A | * | 5/1987 | Quartano | B62B 3/144 280/33.992 |
| 5,547,250 | A | * | 8/1996 | Childers | B62B 3/144 297/219.12 |
| D380,118 | S | * | 6/1997 | Ford | D6/601 |
| 6,224,152 | B1 | * | 5/2001 | Hughes | A47D 15/006 297/219.12 |
| 6,390,552 | B1 | * | 5/2002 | Veron | B62B 3/144 280/33.993 |

* cited by examiner

*Primary Examiner* — Milton Nelson, Jr.

(57) ABSTRACT

A supportive cushion and restraint for an infant or young child in a shopping cart seat which includes an upper cushioned body that provides torso and back support by including a rigid plastic sheet insert located posterior and parallel to compressed polyester padding; and is hinged at a horizontal seam to a lower cushioned body (the seat portion), which encloses compressed polyester padding; a wide belt that secures by hook and loop type fasteners and extends from the upper cushioned body, wrapping forward around the torso, securing the child in place and adjusting to most girths; the upper and lower cushioned bodies are enclosed in the same durable fabric as the wide belt; two pairs of heavy duty strap-and-buckle units extend from the upper cushioned body, providing the means to secure the upper cushioned body to the shopping cart seat, and ensuring proper support and comfortable restraint of the child.

10 Claims, 7 Drawing Sheets

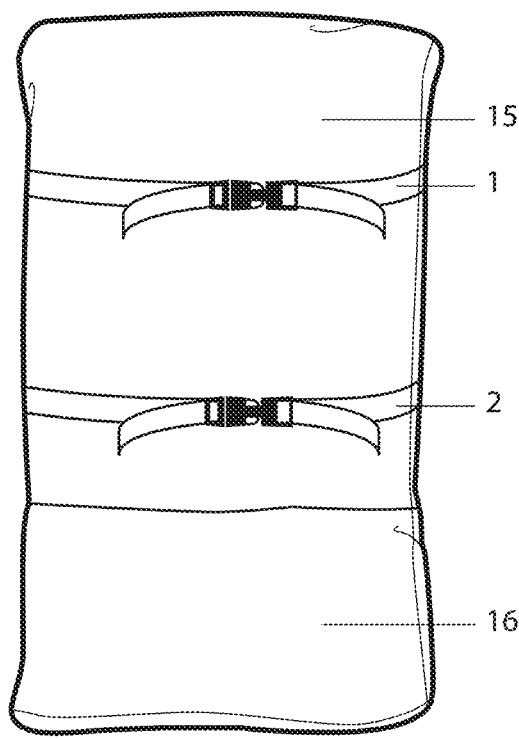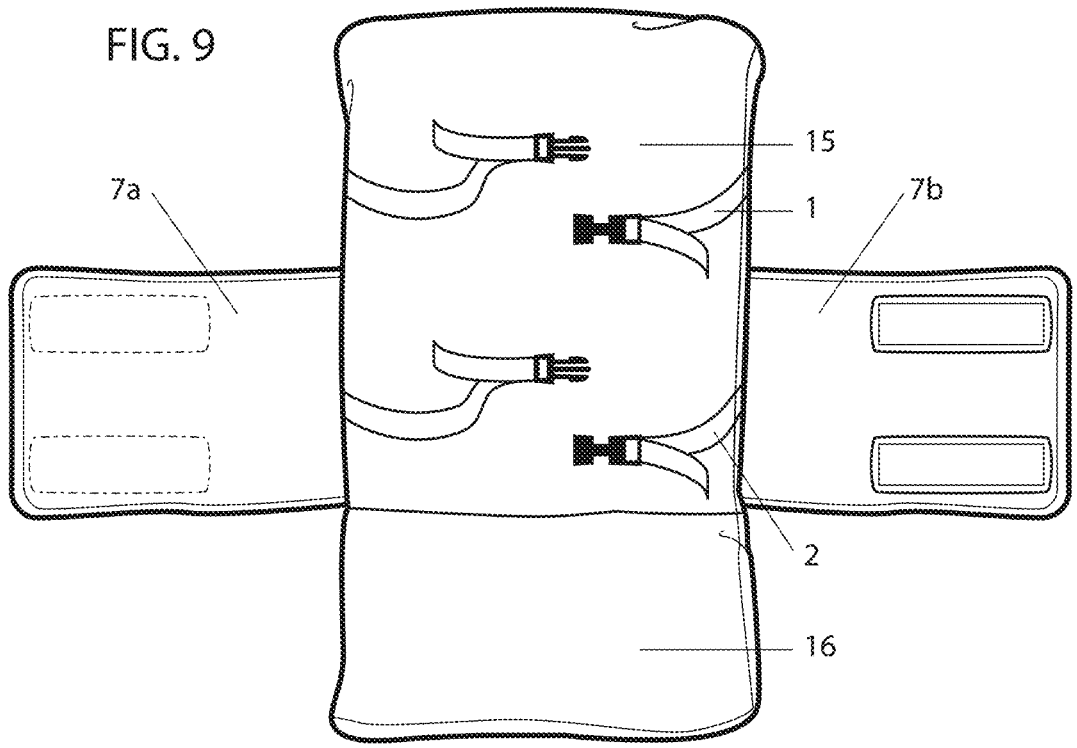

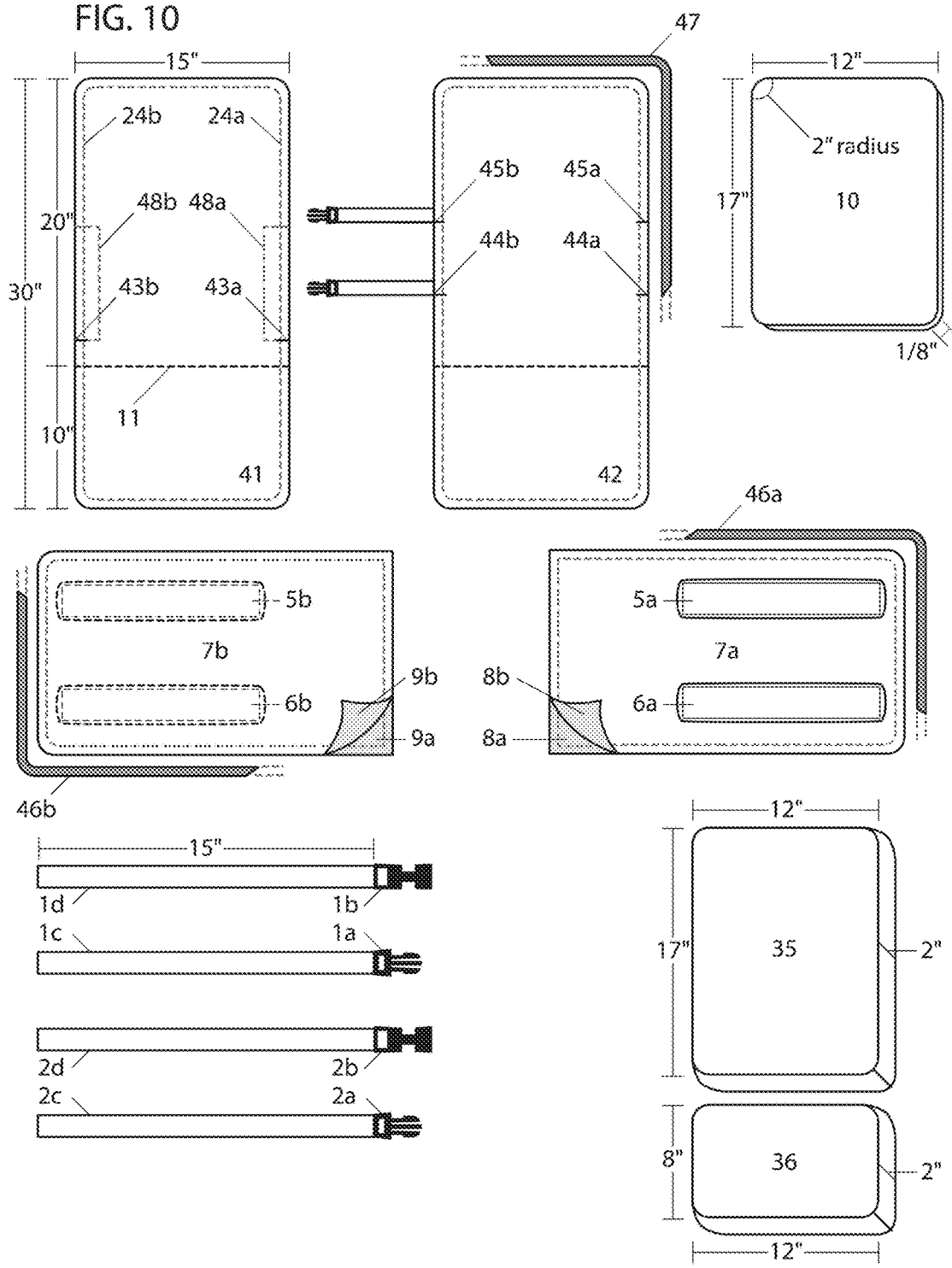

SUPPORTIVE CUSHION AND SHOPPING CART RESTRAINT FOR CHILD OR INFANT

CROSS-REFERENCE TO RELATED APPLICATIONS

This application claims the benefit of U.S. Provisional Application No. 62/492,012, filed Apr. 28, 2017, the disclosure of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of Invention

The embodiments described herein relate to child restraint systems, and more particularly, to a cushion and restraint for use by a child or infant in a shopping cart seat.

2. Description of the Prior Art

There are few options available for children to ride comfortably and safely in shopping cart seats, especially infants who need support to sit up as well as protection from the hard metal or plastic basket shopping cart seat. Older children also need safe and comfortable restraint, which many conventional products to not provide.

Therefore, what is needed is a cushioned restraint system that is also supportive for use by a child or infant in a shopping cart seat.

U.S. Pat. No. 5,330,250 issued Jul. 19, 1994 to Guadalupe E. Reyes, which discloses a liner for a shopping cart child seat, which can be used for an infant seated in the shopping cart seat. The device comprises a body member including a padded backrest and a padded base for the seat portion, but lacks a rigid posterior insert for necessary support. Rigid support located in the upright back portion of the device would contribute to the supportive element of the cushion, which is required for an infant lacking the torso strength to remain upright. Rigid back support is also required for securing the older, stronger child, preventing the extension of the cushion over the back of the shopping cart seat when the child is active. The device has an attachment strap which holds the liner into the child seat, while a restraining strap holds the child within the liner. The restraining strap as presented in this device might cause chaffing in the smaller child, and would not be sufficient in dimension, as opposed to a wide torso belt, to properly support the infant in an upright position. U.S. Pat. No. 5,868,465 issued Feb. 9, 1999 to Prerna J. Kvalvik, discloses a child's seating restraint device and offers similar features, which lack in the supportive elements required especially for younger infants to remain comfortable and upright.

U.S. Pat. No. 5,641,200 issued Jun. 24, 1997 to Jo Ann Howell, discloses a child restraint for a shopping cart comprising a seat portion and backrest portion. There is the absence of winged torso extensions and the device lacks rigidity posterior to the upright cushion and therefore does not provide the necessary support especially required for younger infants to comfortably remain upright. The device includes a pair of shoulder straps designed to extend through the shopping cart seat grid, over the shoulders and through the legs of the child, and double crossed at the chest and neck. The device also comprises a lap strap which extends through the side grids of the shopping cart and extends across the lap of the child. The straps are connected by quick-disconnect couplings. The strap design is complicated and cumbersome to employ, and may cause discomfort and chaffing around the child's shoulder and neck area where the straps come in contact.

U.S. Pat. No. 4,889,388 issued Dec. 26, 1989 to Sherry R. Hime, discloses a transportable seat insert adapted for infants to be used in seats such as high chairs, strollers, and shopping carts. The device is a padded frame including a back wall, a pair of side walls, a bottom portion, and a front portion having a pair of openings through which the infant's legs are placed. A pair of strings are attached at each corner of the lower back wall which can be used to tie the seat insert to the shopping cart seat. The device lacks a supportive torso wrap required for the effective support of a younger infant. The device also lacks the elements required to sufficiently restrain an older, stronger child. Other devices that offer similar features lacking in effective supportive and restraining characteristics include: U.S. Pat. No. 4,568,125 issued Feb. 4, 1986 to Anne M. Sckolnik, which discloses a child safety cushion; U.S. Pat. No. 5,106,155 issued Apr. 21, 1992 to Barbara B. Luehring, which discloses an infant protective cushion system for a shopping carts; U.S. Pat. No. 4,204,695 issued May 27, 1980 to Marilyn F. Salzman, which discloses a shopping cart child seat; U.S. Pat. No. 5,123,699 issued Jun. 23, 1992 to Patricia G. Warburton, which discloses a portable support system with detachable bottom back and side cushions; U.S. Pat. No. 5,967,607 issued Oct. 19, 1999 to Thelma J. Waldroup, which discloses a shopping cart cushion; and U.S. Pat. No. 6,224,152 B1 issued May 1, 2001 to Tammy Sue Hughes and Brett Douglas Hughes, which discloses a support for a baby.

U.S. Pat. No. 4,666,207 issued May 19, 1987 to Anthony G. Quartano, discloses a child shopping cart cushion comprising a seat and back cushion and a cushioned groin link attached to a chest protecting portion. The device contains a lateral constraining strap which is interlocked by a hook and loop fastener with its corresponding strap to control lateral movements of a child older than 1 year of age. For a younger child the device contains loops attached on the seatback portion through which the lateral restraining strap may be passed before being interlocked with its respective hook and loop type fastener interconnections. The device has two sets of nylon strapping with corresponding hook and loop type fasteners to secure the device to the shopping cart seat. The straps and loops design and the absence of rigid posterior upright support would not provide enough torso support for a younger infant or sufficient restraint for an older, stronger child. Other devices that offer similar features lacking effective supportive and restraining characteristics include: U.S. Pat. No. 4,655,502 issued Apr. 7, 1987 to Cynthia A. Houllis, which discloses a multi-adjustable cushion for a shopping cart; U.S. Pat. No. 6,390,552 B1 issued May 21, 2002 to Vicky D. Veron, which discloses a portable seat apparatus; and U.S. Pat. No. Des. 380,118 issued Jun. 24, 1997 to Christine Ford, which discloses a child's quilted shopping cart cushion.

U.S. Pat. No. 5,547,250 issued Aug. 20, 1996 to Shirley A. Childers, discloses a cart caddy for shopping carts comprising a central padded portion, a padded end panel cover portion, and a padded seat back portion. The padded end panel cover portion comprises a strip containing hook and loop type fasteners securing the end panel to the front wall portion of the shopping cart seat. The padded seat back portion extends from the central padded portion and then extends over the back portion of the seat of the shopping cart. Two wings extending from the sides of the seat back portion wrap around the torso of the child and are secured by strips of hook and loop type fasteners. While the torso belt provides some torso support, the lateral movement and lack of rigidity in the upright posterior cushion is insufficient to provide support, especially for a younger infant. Also, the wrap-around design is complicated and cumbersome.

U.S. Pat. No. 6,491,996 issued Dec. 10, 2002 to Mary Ann Digangi, discloses a protective sanitary cover for shopping carts. This device comprises a material with tabs which carry fasteners to secure the cover to the shopping cart seat. Perforated areas can be removed to allow the child's legs to extend through the cover and through the leg receiving openings of a shopping cart seat. The cover is large enough in size to cover all the surfaces within reach of the child or infant, and extends over the handle front, rear and opposite sides of the seat area of the shopping cart. The protective cushioning element of this device is thoroughly lacking, as well as the support for a younger infant and restraint for an older child. Similar devices include U.S. Pat. No. 5,238,293 issued Aug. 24, 1993 to Donna S. Gibson, which discloses a shopping cart seat cover; U.S. Pat. No. 4,805,937 issued Feb. 21, 1989 to Joan L. Boucher, which discloses a handle cover and seat cover for a shopping cart; and U.S. Patent No. 2008/0258528 A1 issued Oct. 23, 2008 to Mary Jean Bush and Jacquelyn R. Lynch, which discloses a shopping cart cover.

REFERENCES CITED

U.S. Patent Documents

| | | |
|---|---|---|
| 4,204,695 | May 1980 | Salzman |
| 4,568,125 | February 1986 | Sckolnik |
| 4,655,502 | April 1987 | Houllis |
| 4,666,207 A | May 1987 | Quartano |
| 4,805,937 | February 1989 | Boucher |
| 4,889,388 | December 1989 | Hime |
| 5,106,155 | April 1992 | Luehring |
| 5,123,699 | June 1992 | Warburton |
| 5,238,293 | August 1993 | Gibson |
| 5,330,250 | July 1994 | Reyes |
| 5,547,250 A | August 1996 | Childers |
| D380118 S | June 1997 | Ford |
| 5,641,200 | June 1997 | Howell |
| 5,868,465 | February 1999 | Kvalvik |
| 5,967,607 | October 1999 | Waldroup |
| 6,224,152 B1 | May 2001 | Hughes, et al |
| 6,390,552 B1 | May 2002 | Veron |
| 6,491,996 | December 2002 | Digangi |
| 20080258528 A1 | October 2008 | Bush, et al |

BRIEF SUMMARY OF THE INVENTION

The purpose of the present invention is to provide cushioned support, protection and restraint for an infant or small child for use in the shopping cart seat. The present invention is uncomplicated in construction, light weight and manageable to transport and store.

In accordance with the embodiment of the present invention, there is provided a support and restraint device for an infant or small child comprising a cushioned body that is divided by a horizontal seam into an upper cushioned body and a lower cushioned body, a wide belt as an extension from the upper cushioned body that wraps around the front of the child's torso secured by strips of hook and loop type fasteners, and two pairs of strap-and-buckle units extending from the upper cushioned body to wrap around the back portion of the shopping cart seat and secure the device. The upper cushioned body is designed to extend slightly beyond the height of the infant's head, to allow for full support of the torso, head and neck. The upper and lower cushioned bodies are filled with compressed polyester padding to provide protection from the shopping cart seat. The upper cushioned body comprises a high density polyethylene rectangular sheet inserted posterior and parallel to the compressed polyester padding, for maximum support and protection, to ensure that the infant's torso is supported uprightly, and to prevent the older child from extending backwards over the shopping cart seat. The lower cushioned body is designed to flexibly fit the seats of most shopping carts. The lower cushioned body comprises compressed polyester padding which will allow for the necessary flexibility for insertion into the varied seat sizes of any shopping cart. The wide belt as left and right extensions from the upper cushioned body creates an adjustable support around the child's torso. These extensions are designed to offer full support and restraint for the child's torso, and constructed with wide strips of hook and loop type fasteners, to be easily adjustable to most girths. The device is unique in that there is restraint and support provided by the wide belt, without the use of shoulder straps which may cause discomfort and chaffing around the child's shoulder and neck area. When the invention is used by an infant, both pairs of strap-and-buckle units wrap around through the back portion of the shopping cart seat, and are easily adjustable for a supportive and secure fit, keeping the cushioned body firmly in place, and the child upright. When the invention is used by a toddler or small child, the upper strap-and-buckle unit wraps around through the back portion of the shopping cart seat to secure the device, while the lower strap-and-buckle unit wraps forward around the child's torso on top of the wide belt, for additional restraint to what is already provided by the wide belt. The fabric enclosing the upper and lower cushioned bodies and comprising the left and right extensions is durable and easy to clean. This fabric, as well as the compressed polyester padding is used for easy care and clean-up. When transporting the device, the cushion easily collapses into a compact form with the wide belt extensions wrapped around the lower cushioned body.

BRIEF DESCRIPTION OF THE DRAWINGS

FIG. 8 is a rear view of the device laid flat not drawn to scale, with the two strap-and-buckle units secured, and the wide belt as left and right extensions wrapped around the front of the device, hidden from view.

FIG. 9 is a rear view of the device laid flat not drawn to scale, with the two strap-and-buckle units not secured, and the wide belt as left and right extensions not secured.

FIG. 10 is a pattern diagram not drawn to scale detailing the precise measurements of the elements comprising the device.

DETAILED DESCRIPTION OF THE INVENTION

Figure 1:
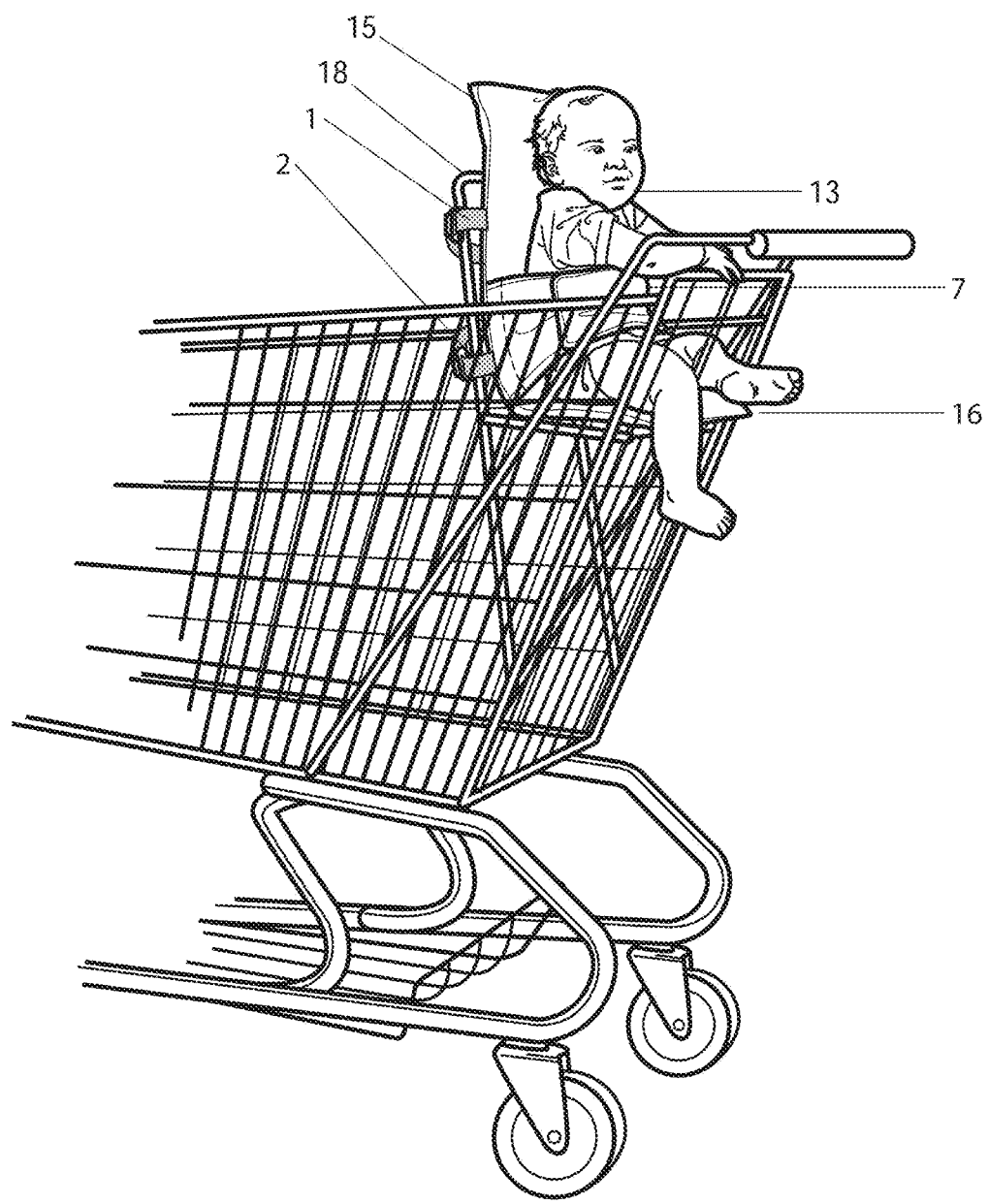
FIG. 1 is an illustration of the lateral view of the shopping cart supportive cushion and restraint device not drawn to scale in use by an infant within a shopping cart seat.

FIG. 1 is a lateral view of the shopping cart supportive cushion and restraint device in use by an infant 13 within a shopping cart seat 18. Upper strap-and-buckle unit 1 and lower strap-and-buckle unit 2 are securely wrapped around and connected through the back portion of the shopping cart seat 18, holding the upper cushioned body 15 upright and firmly in place. The lower cushioned body 16 hinges at an angle of approximately 90 degrees to the upper cushioned body 15. The wide belt 7 wraps around the infant's torso for support and restraint.

Figure 2:
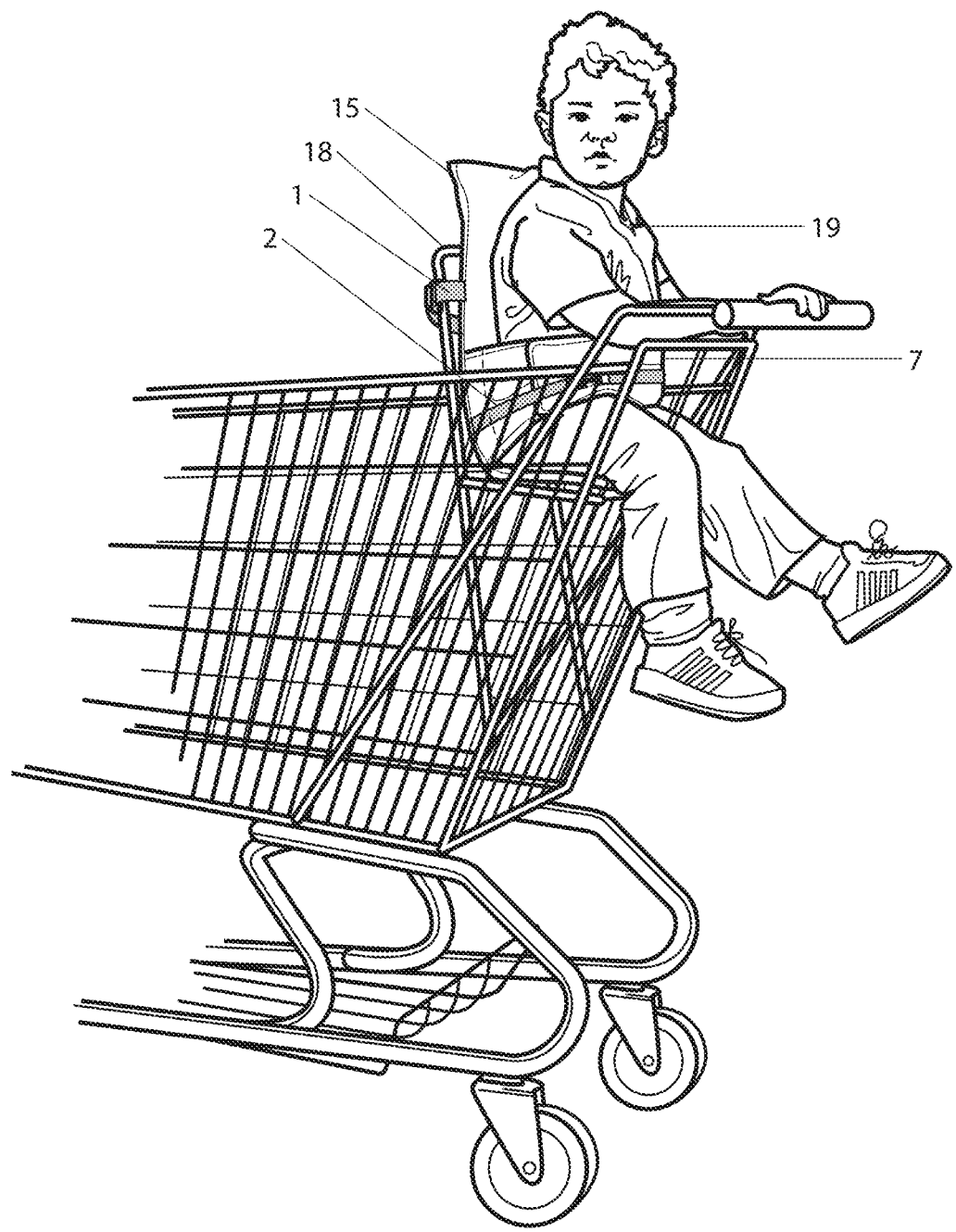
FIG. 2 is a lateral view of the device not drawn to scale in use by a small child within a shopping cart seat.

FIG. 2 is a lateral view of the device in use by a young child 19 within a shopping cart seat 18. The upper strap-and-buckle unit 1 is securely wrapped around and connected through the back portion of the shopping cart seat 18, providing enough security for the upper cushioned body 15 to remain upright. The lower strap-and-buckle unit 2 is wrapped around the small child's torso, connecting in front to afford additional security and restraint to what is already provided by the wide belt 7.

Figure 3:
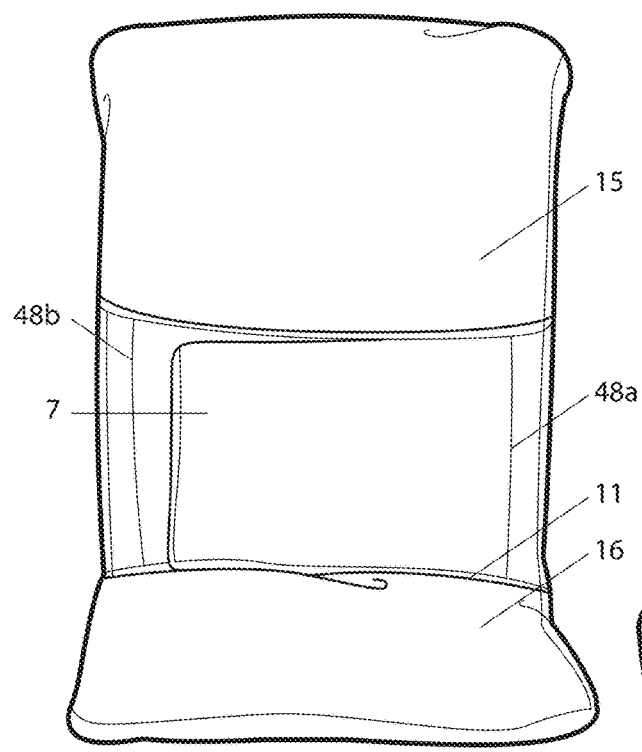
FIG. 3 is a frontal view of the device not drawn to scale, the wide belt as left and right extensions in secure position, and the two strap-and-buckle units wrapping around the back, hidden from view.

FIG. 3 is a frontal view of the device in use position. The wide belt 7 wraps around the upper cushioned body 15. The wide belt 7 is attached on both sides to the surface of the upper cushioned body 15 via seams 48a and 48b, providing the lateral support required for the smaller infant to remain upright. The lower cushioned body 16 is positioned at approximately a 90-degree angle to the upper cushioned body 15, hinged at seam 11.

Figure 4:
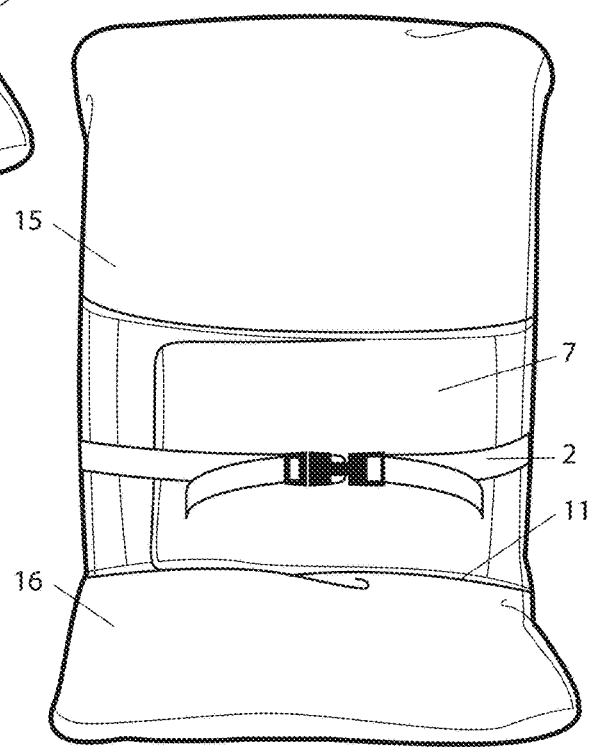
FIG. 4 is a frontal view of the device not drawn to scale, the wide belt as left and right extensions in secure position, and the lower strap-and-buckle unit wrapped forward, and the upper strap-and-buckle unit wrapped around the back of the device, hidden from view.

FIG. 4 is a frontal view of the device in use position, with the lower strap-and-buckle unit 2 secured in the front. The wide belt 7 wraps around the upper cushioned body 15. The lower cushioned body 16 is positioned at approximately a 90-degree angle to the upper cushioned body 15, hinged at seam 11.

Figure 5:
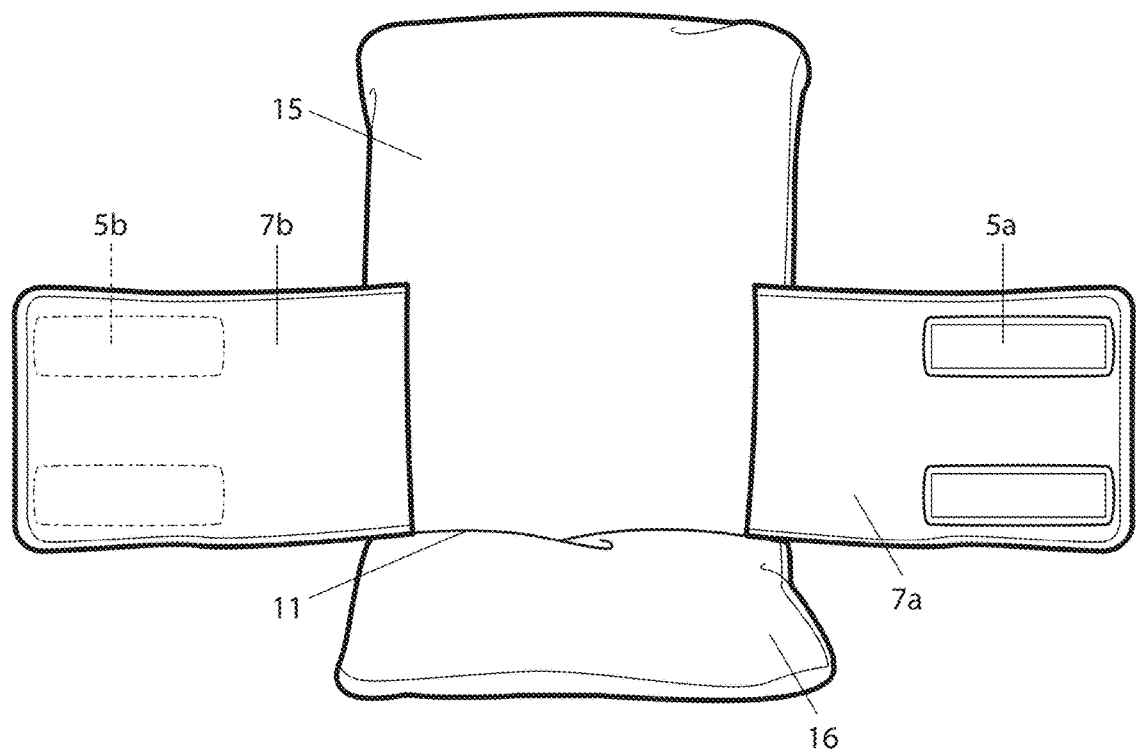
FIG. 5 is a frontal view of the device not drawn to scale, the wide belt as left and right extensions not secured, demonstrating the hook and loop type fastener placement.

FIG. 5 is a frontal view of the device with the right wide belt extension 7a and the left wide belt extension 7b open and unwrapped, extending from the upper cushioned body 15. The lower cushioned body 16 is positioned at approximately a 90-degree angle to the upper cushioned body 15, hinged at seam 11. The view demonstrates the placement of the wide strips of hook and loop type fasteners 5a and 5b.

Figure 6:
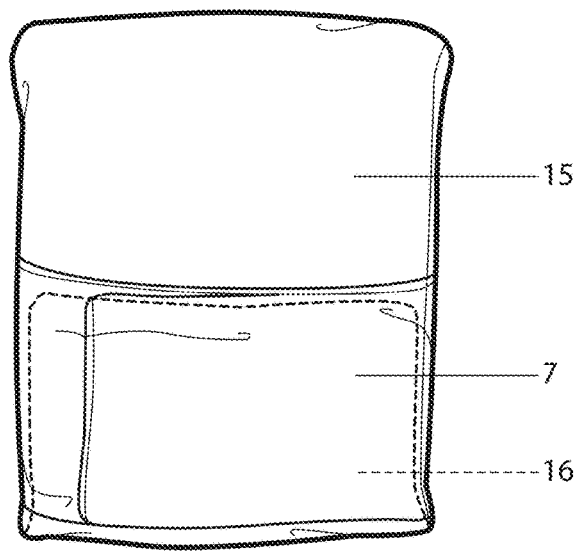
FIG. 6 is a frontal view of the device not drawn to scale, in transport position, the wide belt securing the lower cushioned body to the upper cushioned body.

FIG. 6 is a frontal view of the device, in transport position. The wide belt 7 wraps around the lower cushioned body 16, securing it to the upper cushioned body 15 to allow for more compact transport of the device.

Figure 7:
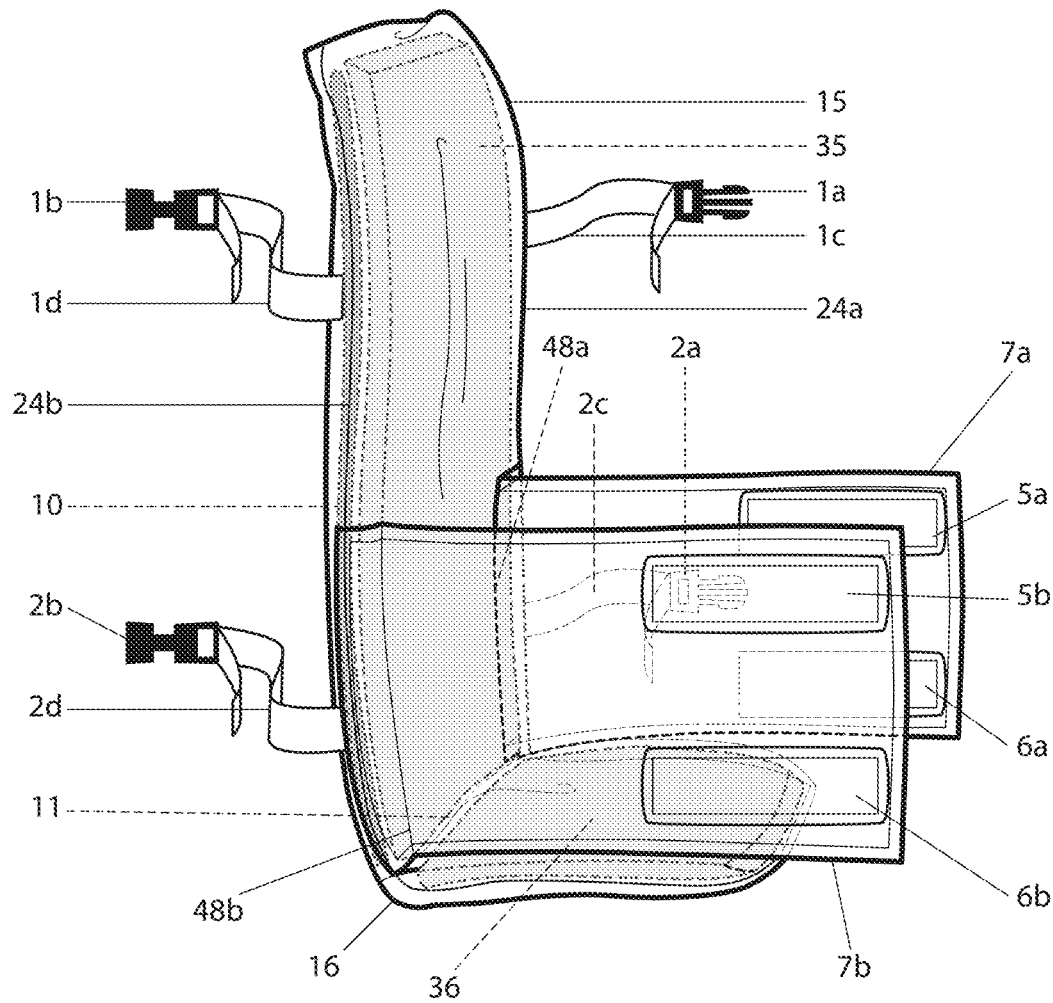
FIG. 7 is a lateral view of the device not drawn to scale, detailing the elements of the design, with the wide belt as left and right extensions not secured, and the strap-and-buckle units not secured.

FIG. 7 is a lateral cross-sectional view of the device, detailing the elements of the design, with the wide belt not secured, and the strap-and-buckle units not secured. The upper cushioned body 15 is hinged at a horizontal seam 11 at approximately a 90-degree angle to the lower cushioned body 16. The fabric enclosing the upper cushioned body 15 is the same fabric enclosing the lower cushioned body 16, and is the same fabric comprising the wide belt as extension 7b and extension 7a. The fabric is a durable and easily maintained material. Within the upper cushioned body 15 is contained a rigid rectangular sheet of ⅛" thick high density polyethylene 10 inserted posterior to the compressed polyester padding 35. The upper strap-and-buckle unit contains two nylon straps 1c and 1d with corresponding buckles 1a and 1b. The lower strap-and-buckle unit contains two nylon straps 2c and 2d with corresponding buckles 2a and 2b. Within the lower cushioned body 16 is contained compressed polyester padding 36. The extension 7b is composed of a two-ply fabric sewn together, inserted and securely sewn into the side seam 24b of the upper cushioned body 15 and in addition attached to the front portion of 15 with seam 48b. The extension 7b includes sewn attached two horizontally parallel sets of hook and loop type fastener strips 5b and 6b. The extension 7a is composed of a two-ply fabric sewn together, inserted and securely sewn into the side seam 24a of the upper cushioned body 15 and in addition attached to the front portion of 15 with seam 48a. The extension 7a includes sewn attached two horizontally parallel sets of hook and loop type fastener strips 5a and 6a. The horizontal pairs of hook and loop type fastener strips 5a corresponds with 5b, and 6a corresponds with 6b.

FIG. 8 is a rear view of the device with strap-and-buckle units 1 and 2 secured, wrapping behind the upper cushioned body 15, which is in horizontal alignment with the lower cushioned body 16.

FIG. 9 is a rear view of the device with strap-and-buckle units 1 and 2 unsecured, the wide belts extensions 7a and 7b unwrapped and extending from the upper cushioned body 15, which is in horizontal alignment with the lower cushioned body 16.

FIG. 10 is a pattern diagram detailing the measurements of the elements comprising the device prior to construction. The cushioned bodies are comprised of two identical rectangular pieces of fabric 41 and 42, each measuring approximately 30 inches vertically and 15 inches horizontally, with all four corners rounded with a 2 inch radius. When divided by the horizontal seam 11, the upper portion of the pattern fabric has dimensions approximately 20 inches vertically and 15 inches horizontally and the lower portion of the pattern fabric has dimensions 10 inches vertically and 15 inches horizontally. The extension 7a is composed of two identical pieces of fabric 8a and 8b that are sewn together with an approximate ¼ inch seam. The extension 7b is composed of two identical pieces of fabric 9a and 9b that are sewn together with an approximate ¼ inch seam. The fabric enclosing the cushioned bodies and comprising the extensions is of the same durable and easily maintained material. Each of the extensions 7a and 7b measure approximately 17 inches horizontally and 9 inches vertically. The distal edges of extensions 7a and 7b are constructed each with a pair of rounded corners with a 2 inch radius. Each of the hook and loop type fastener strips 5a, 5b, 6a and 6b measure approximately 2 inches vertically and 10 inches horizontally. Each of the strap-and-buckle units is composed of a heavy-duty dual-adjustable plastic side locking mechanism 1a, 1b, 2a and 2b fitting one-inch width nylon strapping 1c, 1d, 2c and 2d. There are four nylon straps 1c, 1d, 2c, and 2d, each measuring approximately 15 inches long. Nylon strap 1d attaches to a portion of the locking mechanism 1b that corresponds to the locking mechanism 1a which is attached to nylon strap 1c. Nylon strap 2d attaches to a portion of the locking mechanism 2b that corresponds to the locking mechanism 2a which is attached to nylon strap 2c. The compressed polyester padding 35 measures approximately 2 inches thick, 12 inches horizontally, and 17 inches vertically, with four rounded corners with a 2 inch radius. The compressed polyester padding 36 measures approximately 2 inches thick, 12 inches horizontally, and 8 inches vertically, with four rounded corners with a 2 inch radius. The high density polyethylene posterior insert 10 measures approximately 12 inches horizontally and 17 inches vertically, is ⅛ inch thick, and includes four rounded corners with a 2 inch radius. The polyester extra wide bias tape double fold edging 46a and 46b each measure approximately 43 inches long and ½ inch wide and trim only three sides of 7a and 7b respectively. Polyester corded trim 47 measures approximately 94 inches long and creates a finished edging for the entire cushioned unit enclosed by the fabric of 41 and 42. Seams 48a and 48b attach extensions 7a and 7b respectively to the front surface of 41, and are sewn approximately 1½ inches inward from the lateral seams 24a and 24b of the upper portion of the fabric pattern 41.

To construct the device, reference the pattern diagram FIG. 10. The device is constructed using a durable and easily maintained thread. All seam lines are approximately ¼ inch from edging on approximately ½ inch single or double hem fold, as specified by the following instruction. The device is constructed by first cutting 41 and 42 out of a durable and easily maintained material, each approximately 30 inches by 15 inches, having rounded corners with a 2 inch radius. Then 7a is cut out of the same fabric type, each extension composed of two identical pieces 8a and 8b into rectangles measuring approximately 17 inches by 9 inches, having rounded corners with a 2 inch radius only on the distal edge. Then 7b is cut out of the same fabric type, each extension composed of two identical pieces 9a and 9b into rectangles measuring approximately 17 inches by 9 inches, having rounded corners with a 2 inch radius only on the distal edge. Cut 1c, 1d, 2c, and 2d as nylon straps, each approximately 15 inches long. Heat to melt both ends of all four straps in order to prevent unraveling of the nylon. Cut out compressed polyester padding 35 measuring approximately 17 inches by 12 inches by 2 inches, having all four corners rounded with a 2 inch radius. Cut out compressed polyester padding 36 measuring approximately 8 inches by 12 inches by 2 inches, having all four corners rounded with a 2 inch radius. Cut out each with four rounded corners 5a, 5b, 6a and 6b as two matching pairs of hook and loop type fastener strips, each measuring approximately 2 inches by 10 inches. Cut out insert 10 out of high density polyethylene approximately 17 inches by 12 inches by ⅛ inch thickness, having rounded corners with 2 inch radius. Construct and sew an approximate ½ inch single hem with ¼ inch seam only on the insertion flat edges of 8a, 8b, 9a and 9b. Face the pattern side of 8a and 8b inward and sew a seam along three edges, leaving the insertion edge open. Turn the pattern side to facing outward 8a and 8b, now attached together to compose 7a. Face the pattern side of 9a and 9b inward and sew a seam along three edges, leaving the insertion edge open. Turn the pattern side to facing outward 9a and 9b, now attached together to compose 7b. Sew the insertion edges of 7a and 7b with seams to complete the closure. Sew on polyester extra wide bias tape double fold edging 46a to 7a on three sides, not including the insertion edge, with a length measuring approximately 43 inches long and ½ inch wide. Sew on polyester extra wide bias tape double fold edging 46b to 7b on three sides, not including the insertion edge, with a length measuring approximately 43 inches long and ½ inch wide. Sew 5a and 6a to extension 7a by placing each strip approximately ¾ inch inward from the distal edge opposite the insertion side and ¾ inch inward from and parallel to the horizontal edge, which placement shall pair accordingly with 5b and 6b on extension 7b. Sew 5b and 6b to extension 7b by placing each strip approximately ¾ inch inward from the distal edge opposite the insertion side and ¾ inch inward from and parallel to the horizontal edge, which placement shall pair the hook and loop type fasteners accordingly with 5a and 6a on extension 7a. Construct and sew approximately a ½ inch double hem on all edges of 41 with approximately a ¼ inch seam. Sew approximately a ½ inch double hem on all edges of 42 with approximately a ¼ inch seam. Sew polyester corded trim 47 with approximate length 94 inches along the edges of 42 on top of the double hem. Attach 41 to 42 by sewing horizontal seam 11, pattern of the fabric facing outward, and the double seam facing inward. Sew nylon strap 2c at point 44a onto 42 inside its existing seam, approximately 4½ inches vertical to seam 11. Sew nylon strap 2d at point 44b onto 42 inside its existing seam, approximately 4½ inches vertical to seam 11. Sew nylon strap is at point 45a onto 42 inside its existing seam, approximately 4 inches vertical to nylon strap 2c. Sew nylon strap 1d at point 45b onto 42 inside its existing seam, approximately 4 inches vertical to nylon strap 2d. Sew the flat insertion edge of 7a onto the inside hem of 41, located approximately 2 inches above seam 11 at point 43a. Sew the flat insertion edge of 7b onto the inside hem of 41, located approximately 2 inches above seam 11 at point 43b. Fold extension 7a inward and across the front surface pattern side of 41, sewing seam 48a to attach the proximal portion of extension 7a to the front of 41 approximately 1½ inches horizontally and then extending vertically the entire length of 7a. Fold extension 7b inward and across the front surface pattern side of 41, sewing seam 48b to attach the proximal portion of extension 7b to the front of 41 approximately 1½ inches horizontally and then extending vertically the entire length of 7b. Sew seams to attach 41 to 42, sewing both right and left vertical sides approximately the entire 30 inches in length. Insert compressed polyester padding 36, then enclose the padding with seams along the horizontal edge. Insert compressed polyester padding 35 into upright cushion portion. Insert high density polyethylene support sheet 10 into upright cushion portion posterior and parallel to padding 35. Sew final seams across the top horizontally to enclose padding 35 and support sheet 10. Thread the buckles 1b and 2b with nylon straps 1d and 2d respectively. Thread the buckles 1a and 2a with nylon straps 1c and 2c respectively. Both sides of each buckle and strap unit must be dually adjustable. Sew a one-inch looped stop on the ends of 1d, 1c, 2d, and 2c with reinforced seams.

This supportive cushion and restraint device for use in a shopping cart seat is designed with specific measurements that provide an exceptional range of use for infants and young children, which proves the usefulness, adaptability, and uniqueness of this device. This device functions to provide protection from a hard shopping cart seat, stable torso support for infants who lack the strength to remain upright independently, and a reliable and comfortable restraint for small children. While specific embodiments of the invention have been depicted herein through labeled illustrations and construction delineations, it is recognized that various modifications and adjustments will be apparent to those of ordinary skill in the art. Therefore it is to be presumed that the appended claims are intended to cover all such modifications and adjustments as fall within the true spirit and scope of the invention.

What is claimed is:

1. A supportive cushion and restraint apparatus for a child or infant in use inside a shopping cart seat having a seat bottom, a backrest, a pair of leg openings and a handlebar, the apparatus comprising:
   an upper cushioned body to be releasably engaged with the backrest of the shopping cart seat,
   a lower cushioned body to be arranged in the seat bottom of the shopping cart seat;
   a horizontal seam hinging said upper cushioned body with said lower cushioned body;
   a padding enclosed within said upper cushioned body;
   a rectangular plastic insert enclosed within said upper cushioned body;
   a padding enclosed within said lower cushioned body;
   a fabric enclosing said upper cushioned body;
   a fabric enclosing said lower cushioned body;
   a wide belt comprised of a left extension and a right extension attached to said upper cushioned body, and said right and said left extensions are coupled to define said wide belt;
   a hook and loop type fastener strip attached to said left extension;
   a hook and loop type fastener strip attached to said right extension;
   a seam sewn 1½ inches inward from left side of said upper cushioned body sewn vertically on top of said left extension of said wide belt which secures said left extension to front of said upper cushioned body;
   a seam sewn 1½ inches inward from right side of said upper cushioned body sewn vertically on top of said right extension of said wide belt which secures said right extension to front of said upper cushioned body;
   a fabric enclosing said left extension of said wide belt;
   a fabric enclosing said right extension of said wide belt;
   an upper strap-and-buckle unit extending from said upper cushioned body and comprised of a left strap and a female buckle correlating with a right strap and a male buckle;
   a lower strap-and-buckle unit extending from said upper cushioned body and comprised of a left strap and a female buckle correlating with a right strap and a male buckle.

2. A supportive cushion and restraint apparatus as in claim 1 wherein said left strap of said upper strap-and-buckle unit is comprised of heavy duty plastic side locking mechanism that is adjustable and fitting 1 inch width by 15 inches length of nylon strapping, and said right strap of said upper strap-and-buckle unit is comprised of heavy duty plastic side locking mechanism that is adjustable and fitting 1 inch width by 15 inches length of nylon strapping.

3. A supportive cushion and restraint apparatus as in claim 1 wherein said fabric enclosing said left extension of said wide belt is comprised of two rectangular pieces of a resilient, moisture-resistant material approximately measuring 9 inches vertically and 17 inches horizontally, and said fabric enclosing said right extension of said wide belt is comprised of two rectangular pieces of a resilient, moisture-resistant material approximately measuring 9 inches vertically and 17 inches horizontally.

4. A supportive cushion and restraint apparatus as in claim 1 wherein said rectangular plastic insert enclosed within said upper cushioned body is inserted posterior and parallel to said padding, and said rectangular plastic insert is comprised of high density polyethylene measuring approximately ⅛ inch thickness and 12 inches horizontally and 17 inches vertically.

5. A supportive cushion and restraint apparatus as in claim 1 wherein said padding enclosed within said lower cushioned body is comprised of a rectangular compressed polyester material approximately measuring 2 inches thick and 12 inches horizontally and 8 inches vertically.

6. A supportive cushion and restraint apparatus as in claim 1 wherein said upper strap-and-buckle unit when fastened behind said upper cushioned body and around the backrest of the shopping cart seat, secures said upper cushioned body to the shopping cart seat, while said lower strap-and-buckle unit when fastened behind said upper cushioned body and around the backrest of the shopping cart seat secures said upper cushioned body to the shopping cart seat, for additional support of the infant using the apparatus while said wide belt is coupled.

7. A supportive cushion and restraint apparatus as in claim 1 wherein said upper strap-and-buckle unit when fastened behind said upper cushioned body and around the backrest of the shopping cart seat, secures said upper cushioned body to the shopping cart seat, while said lower strap-and-buckle unit when fastened in front of said upper cushioned body and around the torso of the child using the apparatus while said wide belt is coupled provides additional restraint of the child.

8. A supportive cushion and restraint apparatus as in claim 1 wherein said left strap of said lower strap-and-buckle unit is comprised of heavy duty plastic side locking mechanism that is adjustable and fitting 1 inch width by 15 inches length of nylon strapping, and said right strap of said lower strap-and-buckle unit is comprised of heavy duty plastic side locking mechanism that is adjustable and fitting 1 inch width by 15 inches length of nylon strapping.

9. A supportive cushion and restraint apparatus as in claim 1 wherein said padding enclosed within said upper cushioned body is comprised of a rectangular compressed polyester material approximately measuring 2 inches thick and 12 inches horizontally and 17 inches vertically.

10. A supportive cushion and restraint apparatus as in claim 1 wherein said fabric enclosing said upper cushioned body and said lower cushioned body is comprised of a resilient, moisture-resistant material, and measurement of said material measures approximately 15 inches horizontally and 30 inches vertically.

* * * * *